No. 844,614. PATENTED FEB. 19, 1907.
J. J. NOLTY.
MILK PAIL.
APPLICATION FILED OCT. 8, 1906.
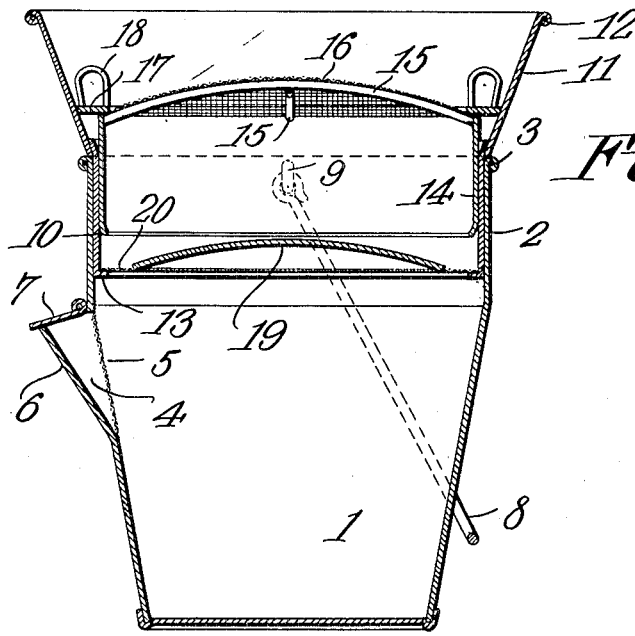
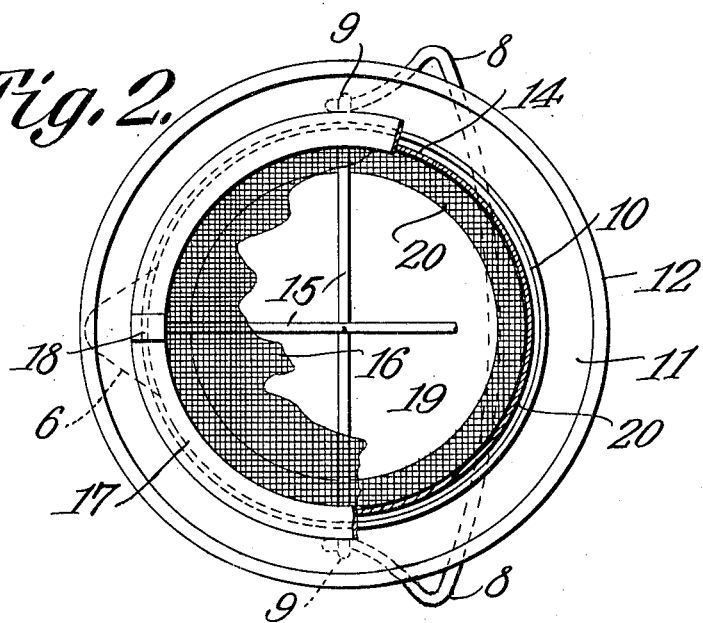
WITNESSES: Jacob J. Nolty, INVENTOR.
By C. A. Snow & Co.
ATTORNEYS

UNITED STATES PATENT OFFICE.

JACOB J. NOLTY, OF CANAL DOVER, OHIO.

MILK-PAIL.

No. 844,614.　　　　Specification of Letters Patent.　　　　Patented Feb. 19, 1907.

Application filed October 8, 1906. Serial No. 338,002.

*To all whom it may concern:*

Be it known that I, JACOB J. NOLTY, a citizen of the United States, residing at Canal Dover, in the county of Tuscarawas and State of Ohio, have invented a new and useful Milk-Pail, of which the following is a specification.

This invention relates to a milk-pail of that class provided with means for straining the milk while passing into the pail and for excluding hair, dirt, and other foreign matter.

The invention has for one of its objects to provide a milk-pail of this character which is of comparatively simple and inexpensive construction, so designed as to permit of its parts being readily removed for cleansing and keeping sanitary and which effectively strains the milk and prevents objectionable odors from having free entrance to the interior of the pail.

A further object of the invention is to provide a milking-pail made up of telescoping sections provided with straining means and with a device on one of the sections operating to exclude the entrance of objectionable odors to the milk in the pail, said device serving to shed the milk that drops onto the same from the top strainer and convey it to a strainer arranged around the same.

With these objects in view and others, as will appear as the nature of the invention is better understood, the invention comprises the various novel features of construction and arrangement of parts, which will be more fully described hereinafter, and set forth with particularity in the claims appended hereto.

In the accompanying drawings, which illustrate one of the embodiments of the invention, Figure 1 is a central vertical section of the milk-pail. Fig. 2 is a plan view with portions broken away.

Corresponding parts in the several figures are indicated throughout by similar characters of reference.

Referring to the drawings, 1 designates the body portion of the milk-pail, which is made of sheet-tin, aluminium, or any other suitable material, the upper portion of the body being cylindrical, as at 2, and having a beaded upper edge 3. The part of the body below the cylindrical portion 2 is preferably tapered, as shown. The body 1 is provided with a discharge-opening 4, which extends downward from the lower end of the cylindrical neck 2 to a suitable distance, which opening is covered by a screen 5 of very fine mesh. At this screened opening is arranged a spout 6, having a hinged cover 7, whereby the spout can be kept closed to exclude bad odors to the interior of the pail. The pail is provided with a bail 8, that is pivotally connected with eyes 9 adjacent the bead 3.

The screening-sections of the pail are removably fitted in the cylindrical portion or neck 2 of the body 1. One section comprises a relatively short cylinder 10, that fits into the neck 2, and an upwardly and outwardly flaring portion or funnel 11, which portions may be made integral or soldered together, as shown. The funnel portion 11 is beaded at 12, and the lower end of the cylinder 10 is bent inwardly to form the internal annular flange 13. The flaring portion or funnel 11 of this section engages the top edge of the neck 2 and prevents the said section from being inserted too far into the pail. The flange 13 forms a support for the screening element of this section of the pail.

The top screen-section comprises a cylinder 14, that telescopes in the cylinder 10, and two diametrically-arranged arched supporting members 15 for reinforcing the gauze wire or other strainer 16. The strainer 16 is crowned to conform to the curvature of the arched supporting-wires 15, and its periphery is soldered to the cylindrical wall 14 of the inner screen-section. The ends of the wires 15 are also soldered, and thus serve to prevent the screen from collapsing. The upper end of the cylindrical member 14 has secured thereto a transverse annular rim 17, which by engaging with the tunnel 11 serves as a stop for limiting the inward movement of the top screen-section. Thus the top screen-section is removably supported in the lower screen-section and is removable with the latter from the body of the pail. To facilitate the removal of the top screen-section from the lower screen-section handholds 18 are provided at diametrically opposite points on the rim 17. When the top screen-section is in place, the screen 16 thereof is located a considerable distance below the top edge of the funnel, so that the funnel acts as a guard for preventing the milk from splashing out as the streams of milk strike upon the screen 16.

The bottom of the lower screen-section has a comparatively limited reticulated area for the purpose of providing a restricted communication between the upper open end of the pail and the interior of the body, which restricted opening operates to reduce to a minimum the entrance of noxious air to the milk in the pail. For this purpose the bottom of the lower screen-section comprises an unperforated diaphragm or crowned wall 19 in the form of a disk having a diameter somewhat less than the diameter of the cylinder 10. Between the periphery of the diaphragm 19 and the cylinder 10 is an annular strainer 20, of gauze or other suitable reticulated material. The gauze is soldered to the internal flange 13, and the crown member 19 is soldered at its periphery to the said annular strainer. The strainer thus supports the member 19. By crowning the member 19 the milk that passes through the upper strainer 16 and falls upon the said member is shed by the latter to the annular screen 20, through which the milk passes to the body of the pail.

In practice the upper screen 16 prevents hair, dirt, flies, and other foreign substances from passing into the pail, and any of the finer particles that happen to pass through the screen 16 will be excluded by the screen 20, which may with advantage be of finer mesh than the upper screen. Should sediment happen to get into the milk in the body 1, this will be screened out by the very fine strainer 5 at the spout, so that the milk will be clean, sanitary, and pure when bottled or canned for the market. The lid 7 of the spout and the member 19 of the inner screen serve to restrict the entrance of any noxious odors to the milk, so that the latter will not be polluted.

I have described the principle of operation of the invention, together with the apparatus which I now consider to be the best embodiment thereof; but I desire to have it understood that the apparatus shown is merely illustrative and that various changes may be made when desired as are within the scope of the invention.

What is claimed is—

1. A milk-pail comprising a body having a cylindrical neck, and a spout in the side of the body below the neck; a bottom strainer-section having a cylindrical lower portion removably fitting in the neck of the body and a funnel extending above the neck, a crowned unperforated plate arranged centrally in the lower end of the cylindrical portion and of less diameter than the latter, and an annular screen connected at its outer edge to the cylindrical portion and at its inner edge to the said plate; and a top strainer-section having a cylindrical body removably fitting in the lower strainer-section, a crowned screen extending entirely across the said cylindrical body, and reinforcing members for supporting the crowned screen and preventing collapsing thereof.

2. A milk-pail comprising a body portion having a cylindrical neck, a spout on the said body portion, a cover for the spout hingedly attached thereto, a screen for straining the milk passing through the spout, a bottom strainer-section having a cylindrical lower end fitted into the neck and provided with an internal annular flange and a funnel at the upper end, a crowned unperforated member separated from the flange, an annular strainer between the member and flange which is supported on the latter and in turn supports the said member, an upper strainer-section having a cylindrical portion fitted into the cylindrical portion of the lower section, a rim on the upper section which coöperates with the funnel of the lower section to limit the movement of the upper section, handholds on the rim, a crowned strainer on the upper section, and reinforcing devices under the strainer.

In testimony that I claim the foregoing as my own I have hereto affixed my signature in the presence of two witnesses.

JACOB J. NOLTY.

Witnesses:
JOHN A. HOSTETLER,
H. H. HOSTETLER.